Aug. 30, 1960  E. A. BODKIN ET AL  2,951,036
ADSORBENT WASHING PROCESS
Filed July 7, 1958  3 Sheets-Sheet 1

INVENTORS
Ernest A. Bodkin
Joseph I. Saboca
BY
John A. Crowley, Jr.
ATTORNEY

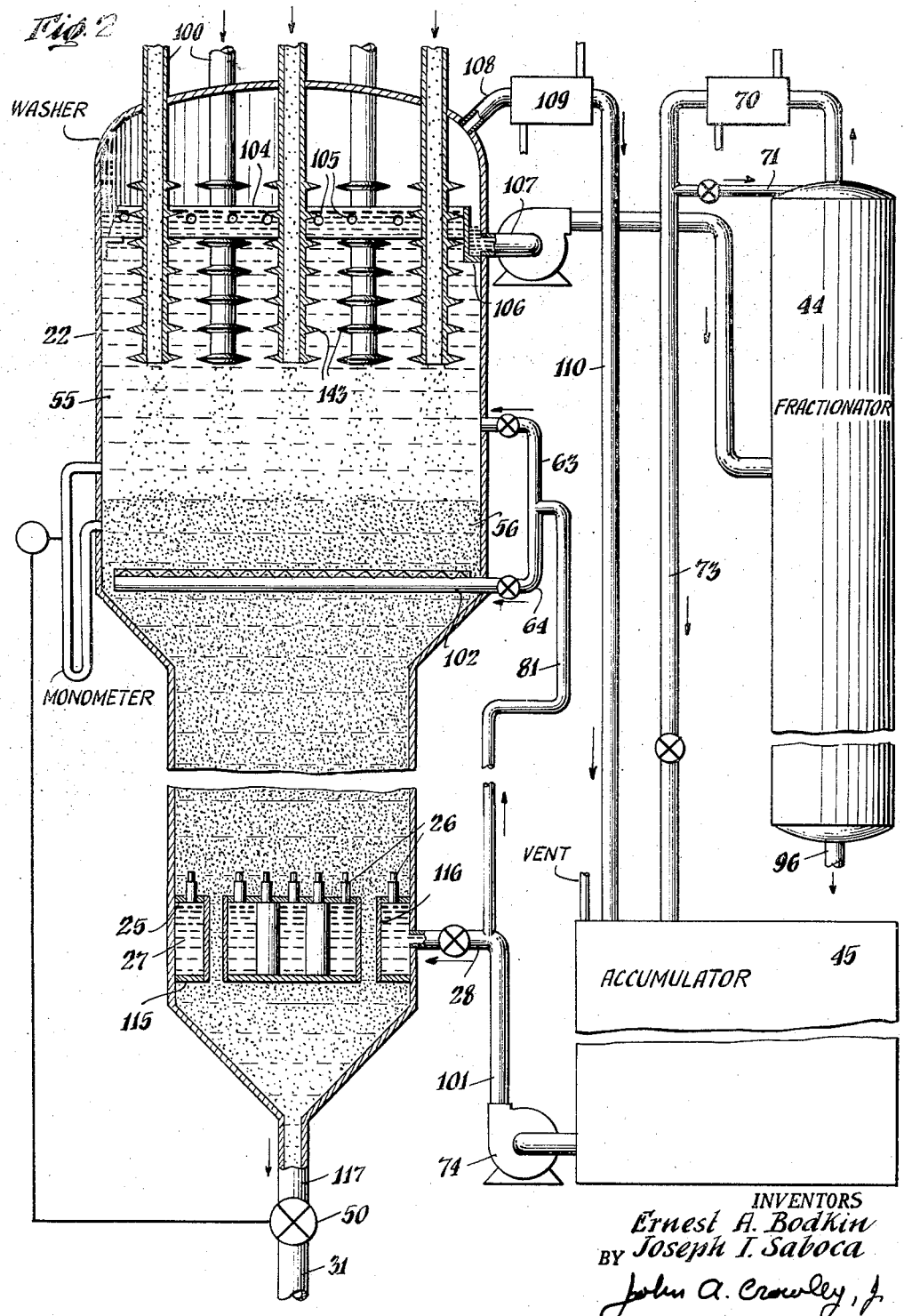

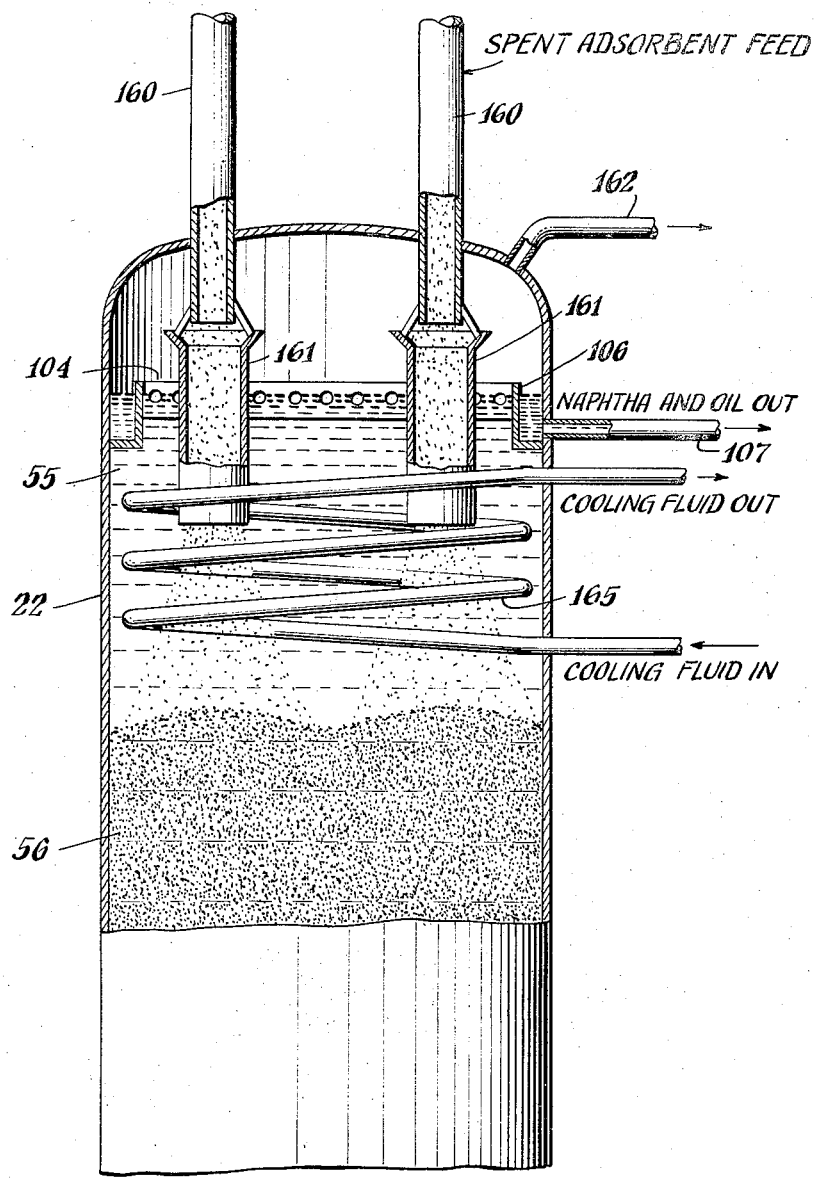

United States Patent Office 2,951,036
Patented Aug. 30, 1960

2,951,036

ADSORBENT WASHING PROCESS

Ernest A. Bodkin, Wenonah, and Joseph I. Savoca, Haddonfield, N.J., assignors to Socony Mobil Oil Company, Inc., a corporation of New York Filed July 7, 1958, Ser. No. 747,326

8 Claims. (Cl. 208—305)

This application is a continuation-in-part of application Serial Number 649,273, filed in the United States Patent Office on March 26, 1957, and now abandoned, which is, in turn, a continuation-in-part of application Serial Number 390,344, filed in the United States Patent Office on November 5, 1953, now abandoned.

This invention relates to a continuous process for washing solid adsorbents which have become spent in treating liquids, particularly organic liquids, and more particularly liquid hydrocarbons and the like, for the purpose of removing from the liquids small amounts of impurities or undesirable contaminants.

Typical of the oil-treating processes with which this invention is concerned are decolorization, neutralization, removal of suspended colloidal or dissolved impurities, such as carbon or coke or oxygen- and nitrogen-containing compounds and other gum-forming compounds, and improvement of demulsibility properties of mineral oils. Other processes may include separation of liquid hydrocarbons by adsorption, solvent extraction and the like. The invention is also applicable to the washing of spent conversion catalysts, such as cracking, hydrogenation or polymerization catalysts, which have become spent in use, for effecting liquid phase catalytic hydrocarbon conversions. Another typical application of this invention is the washing of adsorbents which have become spent from use in the continuous percolation of sugar solutions, for the purpose of removing impurities therefrom. Bone char is a useful adsorbent for this purpose.

Recently, there has been developed a continuous percolation method which is applicable to processes of the kind mentioned above. In the continuous percolation process, as applied to the treatment of hydrocarbons, for example, an adsorbent of palpable particulate form is caused to move downwardly as a columnar mass through a confined treating zone countercurrently to the liquid hydrocarbons being treated. A carbonaceous contaminant is deposited on the adsorbent, which reduces its efficiency. This contaminant is comprised chiefly of hydrocarbonaceous material, but may also include small amounts of oxidized hydrocarbons, sulfur and nitrogen compounds and metallic constituents. Also, where the process involves oil decolorization, color bodies may form a portion of the contaminant deposit. As the adsorbent is withdrawn from the treating zone, a substantial amount of cycle oil or hydrocarbon material similar to the charge being treated is withdrawn along with and as a part of the spent adsorbent stream. This cycle oil includes oil contained in the pores of the adsorbent, oil filling the void spaces between adsorbent granules in the spent adsorbent discharge stream and a certain amount of supernatant oil which flows with but faster than the adsorbent granules in the discharge stream. The supernatant oil and the oil between the pores may be drained off from the adsorbent, and the adsorbent may then be subjected to washing with a solvent for the purpose of recovering all of the remaining oil prior to regeneration of the adsorbent by drying and combustion of contaminant; or the spent adsorbent stream, including oil in pores, voids and supernatant oil, may be passed directly from the treating zone to a washing step for recovery of the total cycle oil from the adsorbent. All of the cycle oil is separated from the wash solvent by fractionation and is then passed to storage or, more desirably, recycled to the treater. This process is the subject matter of claims in United States Patent Number 2,701,-786. The term "cycle oil" shall be used herein unless otherwise indicated, both in describing and claiming this invention, in a sense as broadly covering the sum total of the oil discharged from the treater in the adsorbent pores, in the voids between granules in the discharge stream and the supernatant oil or any one or more of them.

It has been found that this cycle oil may be continuously recovered from the spent adsorbent stream by passing the same downwardly as a columnar mass through a confined, elongated washing zone countercurrent to an upwardly moving stream of a suitable washing solvent. Further, it was discovered, after very extensive experimental and process development work, that the adsorbent could be effectively freed of the occluded cycle oil on a continuous basis, without removal of excessive amounts of color bodies, and without excessive entrainment of the adsorbent in the recovered oil and solvent stream, only by careful observance of certain interrelated operating limits, and, particularly, only by maintenance of certain critical minimum and maximum liquid stream velocities in the washing and disengagement sections of the washing zone.

A major object of this invention is the provision of an improved, continuous process for recovery of valuable liquid material from spent treating adsorbents which bear, in addition to said liquid material, impurities removed from like liquid material.

Another important object of this invention is the provision of an improved, continuous process for washing valuable liquid hydrocarbon material from spent treating adsorbents which bear, in addition to said liquid hydrocarbon material, impurities removed from like hydrocarbon material.

A specific object is the provision, in a continuous process for decolorizing mineral oils by means of cyclically moving adsorbents of palpable particulate form, of an improved method for solvent washing spent adsorbents to substantially completely recover therefrom valuable mineral oil removed therewith from the oil-treating zone while leaving on the adsorbents objectionable contaminant deposits.

Another specific object is the provision of an improved, continuous process for effectively washing mineral oils from spent decolorizing adsorbents by countercurrent solvent washing.

These and other objects will become apparent from the following description of the invention.

In a broad form, this invention involves a process wherein a spent adsorbent of palpable particulate form, bearing valuable liquid material, for example, liquid hydrocarbons and impurities removed from like liquid material, is passed downwardly as a columnar mass through a confined washing zone. A suitable wash solvent, such as a petroleum naphtha (in the case of an adsorbent which has become spent in treating hydrocarbons), is passed upwardly through the columnar mass to strip the liquid hydrocarbon material from the spent adsorbent. The adsorbent residence time in the washing zone is controlled below that at which excessive amounts of impurities would be removed from the adsorbent. The solvent to adsorbent throughput ratios are controlled within a limited range found to be important for effective removal of the valuable hydrocarbons without removal of the impurities from the adsorbent. In addition, the relative length to horizontal cross-sectional area of the columnar mass and the rate of solvent introduction to the washing zone are controlled to maintain the superficial velocity of the solvent flow through the columnar mass below that which would cause substantial disruption of the columnar mass, but above certain critical minimum values below which, it has been found, effective removal of the liquid hydrocarbon material surprisingly is not attained. The recovered hydrocarbon material and solvent are withdrawn from the upper portion of the washing zone while the washed adsorbent substantially free of the liquid hydrocarbon material is withdrawn from the lower section of the washing zone.

As indicated, the invention is also applicable to the washing of adsorbents which have become spent in the treatment of non-hydrocarbon liquids, particularly organic liquids, for the purpose of removing small amounts of impurities therefrom. The method employed is the same as described above, although the solvent employed may differ. For example, in the washing of adsorbents which have become spent in the decolorizing of sugar solutions, the wash solvent employed may be water.

In a preferred form of the invention, the spend adsorbent, for example, one which has been used for decolorizing mineral oils, is supplied to the washing zone as a confined stream which discharges under the surface of a liquid body of solvent and recovered oil maintained above the columnar mass in the washing zone. The washed adsorbent is withdrawn from the lower section of the washing zone at a rate controlled to provide an adsorbent residence time in the columnar mass within the washing zone less than about five hours. The rate of wash solvent supply is controlled to provide a suitable solvent to adsorbent throughput ratio and, further, this rate and the relative height to horizontal cross-sectional area of the columnar mass are controlled so as to provide a solvent superficial velocity within the critical limits mentioned hereinafter. At the same time, the temperature within the washing zone is controlled below a value at which excessive amounts of impurities or color bodies would be removed. The recovered oil and solvent are withdrawn upwardly from the columnar mass into the liquid body thereabove which is of expanded horizontal cross-section relative to the columnar mass. The rate of liquid flow through the liquid body is controlled above a certain hereinafter specified minimum and below a certain hereinafter specified critical maximum limit so at to permit removal from the washing zone in the effluent liquid of very finely divided adsorbent material, the continued existence of which in the cyclic process is objectionable, while leaving in the washing zone all of the adsorbent particles of size suitable for use in the cyclic system.

In conducting this invention, the adsorbent employed should be made up of palpable particles of size within the range of about 4–100 mesh and preferably about 10–60 and still more preferably 15–30 or 30–60 mesh by Tyler Standard Screen Analysis. The particles may take the form of pellets, capsules, pills, plates, cubes, spheres or the like or granules of irregular shape, such as are obtained from grinding and screening. In some cases, the columnar mass may be made up of particles having a combination of the above-mentioned shapes. The terms "adsorbent in palpable particulate form" and "palpable particle form adsorbents" as employed herein in describing and in claiming this invention are intended to generically cover particles of any or all of these shapes having substantial size as distinguished from finely divided particles. The pore structure of the preferred adsorbents is of such that, while micropores are present, substantially more than 30 percent of the pore volume and preferably more than 60 percent of the total pore volume is occupied by macropores (i.e., pores having radii greater than 100 Angstrom units). Typical adsorbents which may be employed are fuller's earth, bauxite, bentonite and bone char, charcoal, magnesium silicate, heat- and acid-activated kaolin, and activated carbon. Synthetic silica or alumina or silica-alumina gel adsorbents and the like may be employed, but preferably the preparation thereof should be controlled to provide a pore structure similar to that of the clay type adsorbents wherein substantially more than 30 percent of the total pore volume is occupied by macropores. Gels of this type are described in United States Patent Number 2,188,007, issued January 23, 1940. It should be understood, however, that by proper control of the operation conditions, adsorbents of the synthetic gel type or otherwise having mostly micropores and less than 30 percent macropores may be employed in the process of this invention, although with somewhat inferior results when used for lubricating oil purification. On the other hand, gels of this latter type have been found to give superior results in the treatment of distillate fuel oils by the method of this invention. Such adsorbents of this latter type are disclosed in United States Patents 2,384,946 and 2,106,744. The invention in its broadest form is intended to be applicable to adsorbents of this type, as well as the preferred adsorbents of larger pore structure.

The invention may be most readily understood by reference to the drawings, of which Figure 1 is an elevational view, partially in section, of a cyclic treating system which includes the washing process of this invention.

Figure 2 is an elevational view, partially in section, of a washer and auxiliary apparatus arranged for operation in accordance with a preferred form of this invention.

Figure 3 is an elevational view, partially in section, showing the upper section of another form of the washing zone adapted for operation by the method of this invention. All of these drawings are highly diagrammatic in form.

Figure 1:
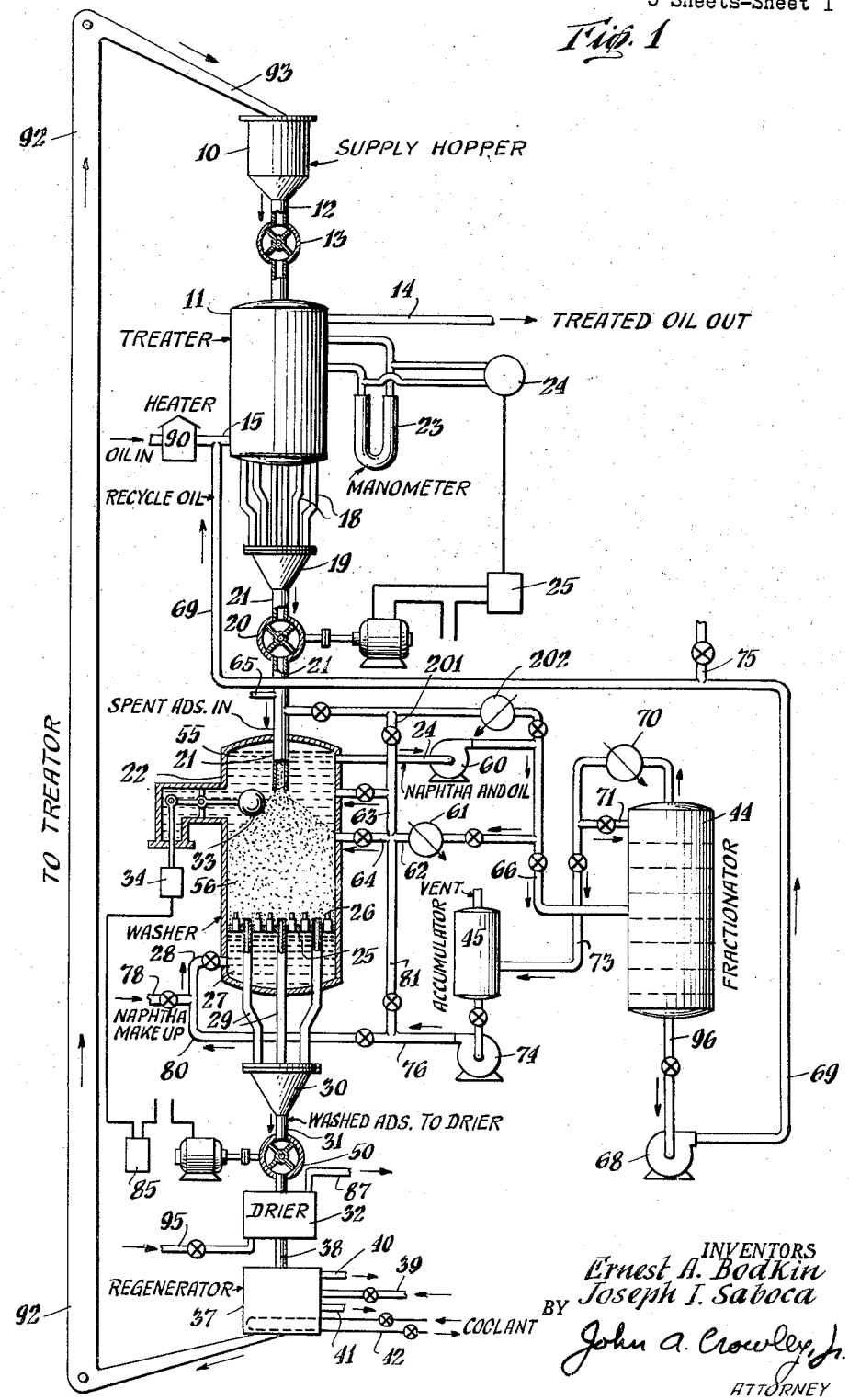

Turning now to Figure 1, there is shown a supply hopper 10 arranged above and communicating with a treater 11 via an adsorbent supply conduit 12. A measuring or forced feed valve 13 is provided in conduit 12 to control the rate of adsorbent flow to the treater. Any of a number of alternative feed devices may be employed at this point, a preferred alternative being shown in United States Patent Number 2,745,795. The treater is provided with an outlet 14 for treated oil product and an inlet 15 for oil feed. Suitable means for effecting a pre-soaking and deaeration of the adsorbent feed may be provided in the upper section of the treater, such as the arrangement shown in United States Patent Number 2,749,290. Suitable means for distributing the liquid oil feed may be provided within the lower section of the treater, such as is shown in United States Number 2,773,012. A plurality of outlet conduits 18 is provided for withdrawal of spent adsorbent from the bottom of the treater, and these conduits connect with a stream-combining cone 19. A single drain 21 conduit containing a flow measuring or regulating valve 20 connects the cone 19 with a vertical washer 22. Details of the adsorbent drain and flow control system are described and claimed in application Serial Number 237,267, filed in the United States Patent Office on July 17, 1951, now Patent No. 2,904,506. A manometric level indicating and control device 23, with suitable instrumentation 24 and motor controller 25, is provided to control the adsorbent column level in the treater within a fixed narrow range. Such a level control arrangement is the subject of claims in application Serial Number 387,744, filed in the United States Patent Office October 22, 1953, and now U.S. Patent No. 2,850,438. The conduit 21 terminates within the upper section of washer 22 at a level spaced below the solvent outlet conduit 24. It will be understood that the adsorbent may be introduced into the washing zone through a plurality of conduits similar to conduit 21, particularly when the washer is of substantial lateral dimension. A partition 25 containing uniformly distributed flow nozzles 26 is provided across the lower section of the washer so as to define a liquid inlet plenum chamber 27. A liquid inlet conduit 28 connects into the washer at the level of chamber 27. The nozzles 26 may be of any of a number of designs adapted for accomplishing uniform distribution of the solvent across the columnar mass in the washer. One desirable form of nozzle is the subject matter of claims in United States Patent Number 2,772,780. Adsorbent drain conduits 29 connect through and depend from the partition 25 and terminate below the washer in a flow combining cone 30. A single drain conduit 31 connects from the cone 30 to a drier 32. A level measuring float 33 is provided in the washer to activate instrument 34 which, in turn, actuates controller 85 operating the motor controlled flow regulating valve 50 in conduit 31. A level regulating and flow control arrangement of this type is the subject of claims in application Serial Number 387,743, filed in the United States Patent Office on October 22, 1953, and now U.S. Patent No. 2,850,439. The drier 32 may partake of any of a number of suitable designs, the one shown diagrammatically in Figure 1 having an inlet near its lower end for stripping gas and an outlet near its upper end for recovered solvent and the stripping gas. A preferred form of drier for this purpose and its operation are the subject of claims in United States Patents 2,813,352 and 2,724,190. A regenerator 37 is provided below the drier and connects thereto through adsorbent flow pipe 38. The regenerator may take any of a number of forms well known to the art adapted for removal of carbonaceous contaminants from adsorbents by combustion at controlled elevated temperature levels. The regenerator shown is provided with an air inlet 39 at an intermediate level and flue gas outlets 40 and 41 near the upper and lower ends of the vessel, respectively. Cooling coils 42 are provided below the regeneration zone. In connection with the washer, there are provided a fractionator 44 and an accumulator 45, the operation and purpose of which are discussed hereinbelow.

For the purpose of illustration, the use of this system for the decolorization of a lubricating oil, such as a petroleum bright stock, will be described; but it should be understood that this is not to be considered as implying that the invention is limited thereto in its application. The decolorizing treatment in zone 11 is usually conducted at a temperature which will provide an oil viscosity within the treating zone of the order of about 5 centipoises. For some oil stocks, temperatures at or only slightly above atmospheric temperature are satisfactory. For stocks of higher viscosity, temperatures may be substantially higher, for example 300 to 400° F. These stocks are sometimes diluted with naphtha to permit treatment at lower temperature levels. When the treatment is to be conducted at an elevated temperature, the lubricating oil charge is preheated in a heater 90 and then supplied to the treater 11 via pipe 15. The oil feed then passes upwardly through the columnar mass in the treating zone at a temperature of the order of 350° F., for example, whereby impurities and color bodies are removed therefrom, the purified oil product being withdrawn via conduit 14. The spent adsorbent bearing carbonaceous contaminants, including color bodies and cycle oil, passes from the bottom of treater 11 via conduits 18 to the cone 19 and then to the washer via conduit 21 at a rate controlled by valve 20. If desired, a drainer may be provided to drain a portion of the oil from the spent adsorbent prior to its introduction into the washer.

The cycle oil removed from the treating zone with the spent adsorbent is substantial in amount, and may range from 0.02 to about 2.0 volumes of oil per volume of fresh oil feed. It may be, in some cases, darker in color than the fresh feed oil, although quite often it is equal to or superior to the fresh oil in physical properties such as color, viscosity, carbon residue and flash point or in susceptibility to treatment to produce a given amount of oil product per unit amount of adsorbent employed. Usually, because of the substantial amount of the cycle oil involved, it is important that it be recycled to the treating zone.

The adsorbent and oil so supplied to the washer initially exist at or near the treating temperature, for example, 340° F. Since the flow is controlled by valve 20, the adsorbent drops freely through conduit 21 into the body of liquid 55, which is maintained in the upper section of the washing zone above the columnar mass of adsorbent 56. The adsorbent discharging from the end of conduit 21 at a level substantially above the surface of the columnar mass drops through a substantial portion of the liquid body prior to reaching the columnar mass surface.

Thus, in operations in which the treating is conducted at substantially higher temperature levels than those desired for the adsorbent washing, the adsorbent is cooled by the solvent-oil liquid by direct heat exchange to a temperature sufficiently low to prevent removal of excessive amounts of the color bodies from the adsorbent by the solvent. While not in all cases necessary, if desired, inert gas may be injected into the pipe 21 via pipe 65 to prevent the rise of liquid or vaporous solvent thereinto. A suitable washing solvent is introduced into the washing zone via conduit 28 and distributed through nozzles 26 into the lower section of the columnar mass of adsorbent. The solvent passes upwardly through the columnar mass to effect removal of the occluded oil from the adsorbent while leaving carbonaceous contaminant, including the color bodies, on the adsorbent. The solvent may consist of a naphtha fraction boiling within the range 210 to 300° F. The solvent and removed oil pass upwardly from the columnar mass 56 into and through the liquid body 55 and are removed entirely in the liquid phase from the upper section of the liquid body via conduit 24. In operations where cooling is needed, a portion of the solvent and oil is circulated by pump 60 through cooler 61 and back into the lower section of the liquid body 55 via conduits 62 and 63. By this means, the liquid body is maintained at a temperature below the boiling point of the solvent. Preferably, the amount of cooling in this manner should be sufficient to maintain the temperature of the liquid body 55 at least in the portion thereof near the surface of the columnar mass 56 below a level at which excessive amounts of color bodies would be removed from the adsorbent when contacted extensively with the solvent.

Also, in those operations where cooling is needed, the adsorbent usually is cooled by heat exchange with the liquid body sufficiently so that it reaches the washing column surface at least below the boiling point of the solvent and preferably below the temperature at which substantial amounts of the color bodies would be removed by the solvent in the washing column. However, if the amount of cooling of the entering adsorbent by the liquid body is not sufficient to cool it to the desired temperature by the time it reaches the columnar mass, the adsorbent may be further cooled by injection of a portion of the cooled liquid into the upper section of the columnar mass via conduit 64. The remaining portion of the solvent-oil liquid stream removed from the liquid body passes via pipe 66 to fractionator 44, wherein the solvent is separated from the oil, any small amounts of color bodies which may have been removed usually going with the oil. The recovered oil having a color not substantially darker than the fresh oil charge is recycled from the bottom of the fractionator to the treater inlet 15 via pump 68 and pipe 69. If desired, some or all of the recovered oil may be withdrawn to storage via pipe 75, but it is usually preferable to recycle all or at least most of the oil to the treater so that there is ultimately only a single decolorized oil product withdrawn from the system via pipe 14. The recovered solvent passes from the top of the fractionator to the condenser 70. A portion of the condensate passes to the fractionator as reflux via pipe 71, and the remainder passes to the accumulator 45 via pipe 73. The solvent passes via pump 74 and pipe 76 and pipe 80 to the washer solvent inlet pipe as the solvent charge. Any make-up solvent which may be required is supplied via pipe 78.

If desired, where cooling of the adsorbent from the treater is required, this may be accomplished by injection of cooling fluid directly into the used adsorbent stream in conduit 21. For example, solvent may be pumped via conduits 81 and 201 into conduit 21, or the solvent-oil mixture may pass from pump 60 through cooler 202 and then into the descending adsorbent stream in conduit 21. In this type of operation, all or part of the cooling which would otherwise be accomplished in the liquid body 55 may be accomplished by direct solvent injection into conduit 21. It should be understood that the present invention is not necessarily limited to any particular method for cooling the used adsorbent or, in some operations, to cooling it at all prior to its delivery onto the columnar mass in the washing zone. When the temperature within the treater is substantially below 180° F., cooling of the used adsorbent passing to the washer is usually unnecessary.

If desired, a portion of the solvent may be pumped via pipe 81 to pipes 63 and 64 as the cooling liquid, in which event all of the solvent-oil stream withdrawn from the liquid body is pumped directly to the fractionator. In operations where cooling in the upper section of the washing zone is not required, all of the solvent-oil liquid stream may be passed directly from the washing zone to the fractionator, and all of the recovered cycle oil may then be recycled to the treating zone.

Washed adsorbent bearing color bodies and other carbonaceous contaminants and some occluded solvent but being substantially free of occluded oil is withdrawn from the lower section of columnar mass 56 via conduits 29 to the combining cone 30 thereby promoting downward flow of the adsorbent through the columnar mass. The rate of adsorbent withdrawal is regulated by means of the float type level measuring device 33 and control instruments 34 and 85 and the motorized valve 50 in drain pipe 31 so as to maintain the surface level of the columnar mass substantially constant. The washed adsorbent passes via pipe 31 to a drier 32 wherein the occluded solvent is removed by heating to a temperature of the order of 300 to 500° F. in the presence of a stripping gas such as steam or flue gas entering via pipe 95. The solvent and stripping gas are passed from the drier via pipe 87 to a suitable separator, the separated solvent being recycled to the washer or to the accumulator 45. Usually, the drier temperatures are maintained sufficiently low that the color bodies and any small amounts of unrecovered oily material remain on the adsorbent in the drier. If drier operating conditions are employed at which such oily materials are removed in substantial amounts, they should be separated from the solvent before recycling of the solvent to the washing step. The dried adsorbent passes to the regenerator 37 via pipe 38 and is then subjected to a combustion supporting gas, such as air, at temperatures of the order of 900 to 1,400° F. to effect removal of the contaminant deposit and color bodies by burning. After regeneration, the adsorbent is cooled by means of coil 42 to a temperature level suitable for reuse in the treater, and the cooled adsorbent is returned to the treater supply hopper 10 via conveyor 92 and chute 93.

Considering further the washer operation, it has been found that the color bodies removed from the oil in the treater are at least in part liquid in form or are, from a practical standpoint, inseparably dissolved in some liquid oily material. It is of considerable importance to avoid overwashing of the adsorbent to the point that excessive amounts of the color bodies are removed with the recovered cycle oil, as this will only result in very low treater yields of specification color product oil from the treater. The same principle applies in other applications of the invention involving treating of oil for removal of small amounts of impurities of various types. The washed adsorbent leaving the lower section of the washing zone should still bear a major portion of the impurities removed from the liquid hydrocarbon charge in the treating zone.

In decolorization operations, it is often preferred to control the operation to avoid removal of "substantial" amounts of color bodies from the spent adsorbent in the washing step, i.e., in an amount sufficient to render the color of the recycle oil substantially darker than that of the fresh oil feed to the treater. Substantially darker cycle oil colors than the fresh oil feed will result in decreased yields of oil product of specified color per unit of adsorbent throughput. Thus, it is preferred in many operations to limit the amount of color bodies removed from the adsorbent below about 25 percent by weight of the color bodies on the adsorbent entering the washer. For many operations, it has been found feasible to accept a reduction in product yield of down to about 70 percent of that obtainable of 100 percent fresh oil feed so as to tolerate a cycle oil of somewhat darker color than the fresh oil feed. In no case should the operating conditions in the washing zone be permitted to cause removal of excessive amounts of color bodies from the adsorbent, i.e., amounts sufficient to result in an unfeasibly low product yield from the treater. In general, the amount of color bodies removed by the solvent in the washing operation should be maintained below about 50 percent by weight of the color bodies on the adsorbent.

Off-color cycle oils may result from use of excessively high temperatures or solvent to adsorbent throughput ratios or from use of the wrong type of solvent in the washing zone. The temperature at which either "substantial" or "excessive" amounts of color bodies will be dissolved from the adsorbent will, of course, depend somewhat upon the nature of the solvent, the nature of the adsorbent and the nature of the color bodies and the amount and color of the cycle oil relative to that of the oil feed involved and the amount of cycle oil removed from the adsorbent. This temperature can be determined by routine tests for any given application. As an example, in the case of a 30 to 60 mesh granular fuller's earth adsorbent which had become spent in decolorizing a bright stock oil from an original color of 180 Lovibond to a finished color of 90 Lovibond, the cycle oil amounted to about 0.12 part per part of oil product and to about 1.8 parts by weight per part of adsorbent. Using a paraffinic naphtha wash solvent boiling in the range of about 210 to 330° F., sufficient color bodies were removed from the adsorbent to render the cycle oil color substantially darker than that of the original oil feed to the treater at temperatures above about 200° F. On the other hand, when the absorbent was cooled to about 120° F. prior to its passage through the column thereof in the washing zone, the color of the removed cycle oil was only 175 Lovibond. In general, it has been found desirable to maintain the temperature in the column portion of the washing zone below about 180° F. and preferably below about 140° F. in order to avoid removal of excessive amounts of color bodies from the adsorbent.

Also, solvent to adsorbent ratios should, in general, be below about 3.0 and preferably below 1.5 on the basis of liquid solvent volume measured at 60° F. and adsorbent volume measured as dry adsorbent as poured into a receptacle without substantial agitation to compact. It should be understood that a certain amount of solvent escapes from the bottom of the washing zone in the washed adsorbent discharge stream. This solvent, usually amounting to a volume approximately equal to the volume of washed adsorbent discharge, is, of course, replaced by make-up or cycle solvent introduced along with that portion of the total solvent entering the lower section of the washing zone. The above numerical ranges are intended to involve only the solvent which passes upwardly through the columnar mass in the washing zone and not the cycle solvent.

In the case of washing adsorbents which have become spent in the treating of hydrocarbons, any suitable non-polar solvent may be employed which boils substantially below the oil treated and at a sufficient low temperature to permit recovery of the oil therefrom in undamaged form. Typical of solvents which may be employed are carbon tetrachloride, normal heptane, normal octane, petroleum naphtha boiling within the range 100 to 400° F. and carbon disulfide. A preferred solvent is a paraffinic naphtha boiling within the range of about 210 to 300° F.

In the case of washing adsorbents which have become spent in the treating of certain non-hydrocarbon liquid materials, suitable polar solvents may be employed.

In some cases, as where the valuable liquid to be recovered from the adsorbent is a solution, the wash solvent may have the same composition as the solute. For example, where charcoal has become spent in removing ash, color bodies or odorous impurities from sugar solutions, water may be the solvent employed to recover the valuable sugar solution from the spent adsorbent particles, while leaving on the adsorbent most of the ash and impurities, which would impart undesirable color or odor to the sugar product. In any case, the solvent employed should be miscible with the valuable liquid to be recovered and physically separable by distillation or otherwise from the valuable liquid without the requirement of conditions, such as temperature conditions, which would damage or cause decomposition of the components of the valuable liquid. In addition, the solvent should have a substantially lower solvent capacity for the impurities which have been removed from the valuable liquid treated than it has for the valuable liquid.

It is also of considerable importance to maintain the amount of liquid oil left on the washed adsorbent as small as possible commensurate with avoidance of off-color cycle oils, since any such oil left on the washed clay is lost through burning in the regeneration zone. It has been discovered that, in order to accomplish reasonably effective oil removal from the adsorbent, even at relatively high solvent to adsorbent ratios and relatively great adsorbent residence periods, the velocity of solvent flow through the adsorbent column in the washing zone must be maintained above a certain critical minimum value. Unless this is done, the oil entering the top of the washing zone tends to channel down through the adsorbent column countercurrent to the solvent flow. In general, the superficial velocity of the solvent through the portion of the washing zone occupied by the adsorbent bed (calculated on the basis of washer free of the adsorbent bed) should be sufficient to cause a pressure drop ($\Delta P$) value to flow through the length (L) of the adsorbent bed in the washing zone at least equal to that corresponding to the static pressure differential expressed by the equation $\Delta P = L(S_o - S_s)$, where L is the length of adsorbent column through which the adsorbent flows in feet, and $S_o$ and $S_s$ are the densities in pounds per cubic foot of the cycle oil and the wash solvent in the washing zone, under the conditions therein. This critical minimum velocity may be expressed by the equation:

$$U = \frac{38{,}500\ D^2 F(S_o - S_s)}{Z_s(1 - F)} \quad (1)$$

where U is the superficial velocity of the solvent in feet per hour through the portion of the washer occupied by the adsorbent column, i.e., the washing zone, D is the average adsorbent particle diameter in inches, F is the fraction of voids between the adsorbent particles as measured in a column formed by pouring the adsorbent into a receptacle, such as a graduate, without substantial agitation of the receptacle, $S_o$ and $S_s$ are the densities of the cycle oil and wash solvent, respectively, within the washing zone measured in grams per cubic centimeter under the conditions therein and $Z_s$ is the viscosity of the solvent in centipoises within the washing zone under the conditions therein. The value of F under the above-indicated conditions for measuring the apparent density ranges broadly from 0.35 to 0.7 and more often from 0.4 to 0.5 for granular materials applicable to this invention. This applies to Equation 1 and to all succeeding equations given herein. When the solvent velocity is maintained at or above the critical minimum expressed by the above equation, the amount of hydrocarbonaceous material left on the washed, spent adsorbent after naphtha removal in the drier will, in general, fall within the range of about 1 to 10 percent by weight of the adsorbent for usual oil purification operations such as decolorization. Of this, about 10 to 90 percent could be extracted as a liquid by extraction with 50 percent methyl ethyl ketone and 50 percent benzol in a standard Soxhlet extractor, the remainder being non-extractible deposits. The amount of hydrocarbonaceous material within the range 1 to 10 percent left on the washed adsorbent will depend upon the nature of the oil stock and adsorbent involved in the treating operation, being higher for oils of relatively high color and viscosity than for lighter oils. For example, where a Mid-Continent oil of 27.3° A.P.I. gravity, 242 centipoises at 100° F. viscosity and 200 Lovibond initial color was decolorized with fuller's earth to a finished color of 100, the amount of hydrocarbonaceous material left on the washed and dried adsorbent after washing with a naphtha flowing at velocity above the critical minimum and at other suitable washing conditions was 5.7 percent by weight of the adsorbent. When this was extracted in a Soxhlet extractor with 50 percent methyl ethyl ketone and 50 percent benzol until the solvent flowing from the extractor was colorless, and the solvent was then distilled, the residual liquid amounted to about 1.7 percent by weight of the adsorbent. This left a non-extractable deposit on the adsorbent amounting to about 4.0 percent by weight. On the other hand, where a Coastal Pale Oil of 25.2° A.P.I. gravity, 100 centipoises at 100° F. viscosity and 9.0 Lovibond initial color was decolorized to provide a finished oil color of 2.0, the hydrocarbonaceous material left on the properly washed and dried fuller's earth adsorbent amounted to 2.4 percent by weight. Of this, 10 percent by weight of the adsorbent was extractible and 90 percent by weight was non-extractible. The above may be considered as typical examples of adsorbents which have been effectively washed in accordance with the method of this invention employing naphtha superficial velocities above the critical minimum in the washing zone. When the naphtha velocity is permitted to fall below the critical minimum, effective washing is not obtained and excessive amounts of valuable oil, which could otherwise be purified or decolorized, are left on the adsorbent going to the kiln. This is shown in the data presented in Table I, which data are based on experimental continuous washing tests conducted on a fuller's earth adsorbent which had become spent in use in decolorizing a lubricating oil. This adsorbent was washed by means of a paraffinic naphtha having a gravity of 59.5° A.P.I., a viscosity of 0.5 centipoise at 100° F., and a boiling range of 210 to 330° F. The average diameters of the 15/30 and 30/60 mesh fuller's earth samples employed in these tests were 0.030 and 0.015 inch, respectively. At standard conditions of 60° F., the density of the oil on the spent adsorbent was 0.9042 gram per cubic centimeter, and that of the wash naphtha was 0.7408 gram per cubic centimeter. The fraction of voids in the adsorbent column in the washing zone was about 0.48.

TABLE I

*Effect of solvent velocity on effectiveness of adsorbent washing*

|  | Solvent Velocity Approximately at Critical Minimum | | Solvent Velocity Below Critical Minimum | |
|---|---|---|---|---|
| Adsorbent Mesh Size—Tyler | 30/60 | 15/30 | 30/60 | 15/30 |
| Superficial Velocity—Ft./Hr.: | | | | |
| Naphtha Solvent | 3.2 | 11.7 | 1.5 | 4.1 |
| Adsorbent | 7.5 | 13.3 | 3.8 | 4.5 |
| Factor Indicative of Relative Amount of Extractible Hydrocarbonaceous Material on Adsorbent After Washing and Drying at 400° F | 1.25 | 1.00 | 16.2 | 12.5 |
| Adsorbent Residence Time—Hr | 1.3 | 1.5 | 1.3 | 1.5 |
| Naphtha to Adsorbent Ratio in Wash Column (Volumetric) | 0.4 | 0.9 | 0.4 | 0.9 |
| Wash Column Temperature—° F | 124 | 122 | 133 | 123 |
| Difference in Density at Wash Column Temp. ($S_o - S_s$) Grams Per Centimeter | 0.1695 | 0.1694 | 0.1689 | 0.1691 |
| Viscosity of Naphtha at Wash Column Temp.—Centipose | 0.45 | 0.46 | 0.42 | 0.45 |
| Volume Percent Oil in Liquid Stream from Washer | 62.5 | 63.5 | 74.0 | 66.5 |

It will be noted from the above table that the naphtha velocities, 3.2 and 11.7 feet per second for the 30/60 and 15/30 mesh adsorbents, respectively are approximately at the critical minimum solvent velocity expressed by the equation given hereinabove. It will be noted that, when the naphtha superficial velocity was permitted to drop substantially below the critical minimum, the extractible hydrocarbonaceous deposit on the washed and dried adsorbent increased about 12 to 13 fold, even though the adsorbent residence time and the naphtha to adsorbent throughput ratio were constant. Increasing the naphtha to adsorbent ratio and the adsorbent residence time to values substantially higher than those required for effective washing of the adsorbent will not accomplish effective removal of the entrained oil from the adsorbent unless the superficial naphtha velocity is maintained above the critical minimum defined in the equation presented hereinabove. By "extractible hydrocarbonaceous deposit" is meant that portion of the total deposit which could have been removed from the adsorbent as a liquid by Soxhlet extraction. In the data for the above table, this extractible oil amounted to something of the order of 0.2 to 0.5 percent by weight of the adsorbent for the properly washed clay, leaving a non-extractible residue of the order of about 2.5 percent by weight.

Also, it is important, in the method of this invention, to provide true columnar flow in the washing zone and to avoid that type of semi-suspended or fluidized type of flow wherein the particles are free to wander upwardly, as well as downwardly and laterally, in the bed during their net downward passage through the bed. True columnar flow and true countercurrent contacting of the naphtha and adsorbent particles may be insured by maintaining the superficial velocity of the naphtha through the washing column not greater and preferably below that expressed by the equation:

$$U = \frac{250{,}000 D^2 \left(\dfrac{S_a}{1-F}\right)\left(1-\dfrac{S_s}{S_t}\right)}{Z_s} - V_c F \qquad (2)$$

where U is the superficial velocity of the liquid through the portion of the washing zone occupied by the columnar mass in feet per hour (calculated on the basis of the total cross-section of the zone when empty of solid particles), $Z_s$ is the viscosity of the solvent under the average conditions within the washing zone in centipoises, $S_s$ is the density of the solvent under the average conditions in the washing zone, D is the average particle diameter in inches (calculated by averaging the reciprocal of the particle diameters) and broadly within the range 0.0058 to 0.185 inch, $S_a$ is the apparent density of the adsorbent in grams per cubic centimeter measured by pouring the dry adsorbent into a container without substantial agitation to further compact, $S_t$ is the true density of the solid adsorbent material in grams per cubic centimeter, F is the fraction of voids between the solid particles under the same conditions at which the apparent density is determined and within the range of about 0.42 to 0.49, and $V_c$ is the linear velocity of the solid particles through the washing zone in feet per hour. In general, for 15/30 and 30/60 mesh adsorbents of the fuller's earth and bauxite type, the superficial velocity of the wash solvent in the column within the washer falls within the range of about 1 to 30 and preferably 5 to 20 feet per hour, respectively. (Based on liquid at the contacting temperature and the free horizontal cross-sectional area of the washer when empty.)

It has been further found that effective washing of the adsorbent also depends upon maintaining the naphtha to adsorbent volumetric throughput ratio above a critical minimum, which is expressed by the equation:

$$R = \frac{C}{4.94\,C - 1.10} \qquad (3)$$

where R is the volumetric ratio of naphtha to adsorbent passage through the washing zone (naphtha measured as liquid at 60° F. and adsorbent volume measured as volume of dry adsorbent as poured into an open container without substantial agitation to compact, i.e., under same conditions for measuring apparent density), and C is the hydrocarbonaceous matter remaining on the adsorbent expressed as percent weight carbon based on clean, dry adsorbent. In general, for 15/30 and 30/60 mesh Tyler granular adsorbents, the minimum volumetric naphtha to adsorbent ratio should be at least 0.2 and preferably 0.4. The above relationship holds, provided the velocity of wash solvent is maintained above the critical value as expressed by Equation 1.

Adsorbent residence times in the washing column (columnar mass) within the range 0.2 to 5 and preferably 0.25 to 3 hours were found suitable for effective removal of the entrained oil, provided wash solvent velocity is maintained above the aforementioned critical minimum. In some operations, it has been found desirable to maintain the adsorbent residence time in the washing column within the range 0.6 to 5 hours. The residence times for adsorbent flow throughout the washer or washing zone fall within essentially the same range.

Thus, in a typical washing operation, the rate of adsorbent withdrawal from the bottom of the washing zone and the rate of adsorbent supply to the upper end thereof are controlled to maintain the adsorbent residence time in the washing column at a suitable value within the range 0.2 to 5 hours, for example, 0.3 hour; the rate of solvent introduction via conduit 28 is controlled to maintain the volumetric solvent to adsorbent ratio in excess of 0.2 and below about 3. Further, the interrelationship between the length to horizontal cross-sectional area of the columnar mass in the washing zone and the rate of solvent introduction are so maintained or controlled as to provide a superficial solvent velocity in the column above that defined by Equation 1 and below that defined by Equation 2 whereby the entrained oil is effectively removed from the adsorbent.

Also, for those operations in which cooling of the spent clay from the treating step is needed to provide satisfactory washing temperatures, the cooling by injection of solvent into conduit 21 or into the liquid body or column of adsorbent via pipes 24 and 62, respectively, may be supplemented by further control of the rate of solvent introduction via conduit 28 to effect temperature control of the adsorbent column 56 by the washing solvent. For example, the hot adsorbent from the treater 11 may be substantially cooled by the liquid body in the washer from a treating temperature of about 350° F. to a temperature of about 200° F. The temperature in the column 56 is controlled at a still lower level, for example, 140° F., by means of the solvent entering the washer via conduit 28 at a carefully controlled rate. In some operations, the entire cooling and temperature control load in the washing zone may be handled by the solvent entering via conduit 28. In these operations, it is important that the heat capacity of the solvent supplied to the washing zone between its inlet temperature and that of the adsorbent falling onto the top of the column 56 be at least equal to the heat capacity of the adsorbent over the same temperature range, and preferably the heat capacity of the solvent should be at least 10 percent in excess of the amount above indicated. Under these conditions, the adsorbent is withdrawn from the washing zone substantially at the solvent inlet temperature, and the solvent leaves the top of the columnar mass at or somewhat below the temperature of the partially cooled adsorbent falling from the liquid body onto the columnar mass. The advantage in the last-mentioned method lies in the fact that the washing operation may be conducted at suitably low washing temperatures while the liquid body is maintained at a somewhat higher temperature where the viscosity of the mixed solvent-oil liquid is lower than it would be if the liquid body were cooled all the way down to the desired washing temperature. As a result, the fluid viscosity in the zone where the liquid is disengaged from the spent adsorbent feed is maintained at a level better suited for effecting the disengagement without adsorbent entrainment in the effluent. In general, for decolorizing lubricating oils, it has been found desirable to control the rate of wash solvent supply into the lower section of the washing zone to maintain the temperature of the column 56 below about 180° F. and preferably in the 100 to 140° F. range or lower, depending upon the oil and adsorbent involved.

In the process of this invention, the adsorbent material should be one in which the heavily predominant portion of the particles falls within the range about 4 to 100 mesh (Tyler), i.e., average particle diameter of 0.0058 to 0.185 inch. It is usually desirable to employ an adsorbent made up of particles, the major portion of which falls within the range about 10 to 60 mesh (Tyler), for example, a 15/30 or 30/60 mesh clay. Adsorbent streams of this size range may contain minor percentages of particles having sizes above and below these ranges. Also, during circulation in the cyclic treating process, some attrition of the adsorbent with fines formation will occur. It is important to avoid entrainment in the effluent washer fluid stream of adsorbent particles within the size range useful for the treating process. Usually, it is desirable to retain all particles up to about 100 mesh size Tyler screen scale. It has been found that this may be accomplished by limiting the linear velocity of the liquid moving upwardly in the liquid body above the adsorbent column in the washer not in excess of that expressed by the equation:

$$U_d = \frac{113}{Z}\left(\frac{S_a}{1-F}\right)\left(1-\frac{S_L}{S_t}\right) \qquad (4)$$

where $U_d$ is the linear fluid velocity in the washer disengaging section in feet per hour, $Z$ is the viscosity in centipoises of the mixed oil and solvent fluid flowing upwardly in this section under the conditions therein, $S_a$ is the apparent density of the adsorbent in grams per cubic centimeter, $S_t$ is the true density of the solid adsorbent material in grams per cubic centimeter, $S_L$ is the density of the mixed oil and solvent fluid under the conditions in the disengaging section in grams per cubic centimeter, and $F$ is the fraction of voids in the adsorbent at the apparent density $S_a$.

Also, it is usually desirable to insure entrainment from the washing zone and, thus, removal from the system of adsorbent particles of size smaller than about 200 mesh (Tyler). This may be accomplished by maintaining the fluid linear velocity in the disengaging section above that expressed by the equation:

$$U_d = \frac{28.3}{Z}\left(\frac{S_a}{1-F}\right)\left(1-\frac{S_L}{S_t}\right) \qquad (5)$$

where the variables are the same as indicated for Equation 4.

Preferably, a somewhat finer cut is made between rejected and retained material. Thus, the velocity is either controlled to retain 100 mesh material and reject material smaller in size than 150 mesh or it is controlled to retain material up to 150 mesh size and reject material finer than 200 mesh size. In the former case, the fluid velocity in the disengaging section is maintained below that defined by Equation 4 but above that defined by the equation:

$$U_d = \frac{56.5}{Z}\left(\frac{S_a}{1-F}\right)\left(1-\frac{S_L}{S_t}\right) \qquad (6)$$

where the variables are the same as indicated for Equations 4 and 5. In the latter case, the fluid velocity in the disengaging section is maintained below that defined by Equation 6, but above that defined by Equation 5.

For some operations, the fluid velocities in the disengaging section may be maintained below those expressed by Equations 4 and 6, while at the same time satisfying the superficial velocity requirements for the washing column section as expressed by Equations 1 and 2 in a washer of uniform cross-section along its entire length. On the other hand, for many operations, the volume of liquid flow greatly increases in the upper section of the washer due to generally higher temperatures existing there and due to the addition of recovered oil and recycle solvent to the principal stream of wash solvent. For these operations, in order to satisfy both Equations 1 and 2 in the washing column and Equations 4 and 6 in the disengaging section, it has been found important to expand the horizontal cross-sectional area of that portion of the washer occupied by the liquid body above the adsorbent column.

Such an arrangement is shown in Figure 2, in which there is also shown a method for cooling the spent adsorbent from the treating zone by indirect heat transfer rather than by the method of direct heat transfer with the solvent shown in Figure 1. In Figures 1 and 2, the same numerals are applied to corresponding elements. In the arrangement shown in Figure 2, the spent adsorbent enters the washing zone as a plurality of laterally spaced vertical streams, confined in the tubular inlet pipes 100. The pipes 100 extend a substantial distance below the surface of the liquid body 55 so that the adsorbent is cooled by indirect heat transfer with the solvent to a temperature preferably below the boiling point of the solvent prior to its discharge from the tubes at a common level above the surface of column 56. Fins 143 may be provided on the tubes 100 to augment the heat transfer surface. If desired, inert gas may be supplied into the pipes 100 above the washer to prevent entry of liquid into the lower ends of the pipes. The liquid body is cooled by recirculation of cooled solvent from accumulator 45 via pump 74 and pipes 101, 81 and 63. The adsorbent may be further cooled by introduction of a portion of the cooled solvent via pipe 64 into the perforated pipe distributor 102. It will be understood that a plurality of the distributors 102 may be distributed across the horizontal cross-sectional area of the adsorbent column.

A channel 104 is positioned across the upper section of the washer for liquid solvent-oil removal. A plurality of liquid flow orifices 105 is provided at spaced intervals along a common level on the channel intermediate its open top and closed bottom. One end of the channel connects into a drain trap 106 into the lower portion of which the outlet pipe 107 is connected. This arrangement for liquid withdrawal is the subject of claims in United States Patent Number 2,758,070. While it is desirable, in order to prevent excessive resolution of the color bodies and entrainment of adsorbent in the effluent solvent, to maintain the temperature throughout the liquid body below its boiling point, it has been found to be possible by the arrangement shown in Figure 2 to cool the adsorbent to a suitable temperature before its discharge into the liquid body well below its surface while a minor portion of the solvent is vaporized at the surface of the liquid body where the vapors do not interfere with the adsorbent fall onto the columnar mass. In this manner, a portion of the cooling load is met by the vaporization of some of the solvent, the vapors being withdrawn via pipe 108 to condenser 109, from which the condensate passes via pipe 110 to the accumulator 45. This method of operation, involving the removal of the solvent partially as a vapor and partially as a liquid while relying on the vaporization of some of the solvent for a portion of the heat removal load from the washer, is the subject matter of specific claims in United States Patent Number 2,771,408.

The washer shown in Figure 2 further differs from that shown in Figure 1 in the adsorbent withdrawal system. In Figure 2, a second partition 115 is positioned across the washer below the distributor partition 25 and above the bottom of the washer, thereby providing an enclosed liquid feed plenum space 27. Washed adsorbent is withdrawn from above the partition 25 to a level below the partition 115 by a ring of uniformly spaced tubes 116. The adsorbent is then combined into a single bed, from which it is withdrawn via the single central outlet conduit 117.

If desired, in those operations in which the spent adsorbent enters the washer at a temperature substantially above the desired washing temperature, heat may be extracted from the upper section of the liquid body and, thus, from the entering adsorbent by indirect heat transfer rather than direct injection of the naphtha or naphtha-oil stream. Such an arrangement is shown in Figure 3, in which there is presented in vertical cross-section the upper portion of a washing tower. In this arrangement, spent adsorbent is delivered into the washer via conduits 160, which deliver into the open upper ends of vertical tubes 161. The tubes 161 terminate on their lower ends at a common level a substantial distance below the surface of liquid body 55 but above the surface of column 56. Solvent rises into the lower ends of the tubes 161 to seek its level therein. The hot spent adsorbent is charged at a rate permitting free fall thereof through the tubes 161, whereby it is cooled by the liquid therein and further by the liquid body below the tubes and above the column surface. This arrangement is particularly useful for application in which the spent adsorbent has been drained and partially dried prior to supply into the washing zone. Any gas removed from the entering adsorbent stream and any vapors resulting from initial contact of the hot adsorbent with the solvent are removed from the liquid body upwardly through the tubes 161 and from the washer via conduit 162, thereby avoiding interference with the free setting of the solid particles through the liquid body 55 and avoiding the creation of eddy currents in the liquid body which might lead to serious entrainment of adsorbent particles. The liquid body 55 is cooled by means of a suitable cooling fluid, such as water, naphtha, air, etc., circulated through the cooling coil 165. The adsorbent may be further cooled by provision of similar cooling coils in the upper section of the column 56, if desired.

The length of the columnar mass of adsorbent in the washing zone may range from about 5 to 20 feet. The vertical depth of the liquid body above the columnar mass may range from about 1 to 6 feet. When the adsorbent is cooled by indirect heat transfer, as in Figure 2, the distance which pipes 100 extend below the surface of the liquid body 55 depends mainly on the relative temperatures of the entering adsorbent and of the liquid body, the over-all heat transfer coefficient and the properties of the solvent. Generally, the pipes 100 should extend from about 2 to 6 feet below the surface of the liquid body. They may terminate directly on or from 6 to 18 inches above the surface of the columnar mass. When the adsorbent is cooled by direct contact with the solvent as in Figure 1 and particularly as in Figure 3, the feed tubes should extend below the liquid body surface about 1 to 4 feet and should terminate above the surface of the columnar mass by more than three inches and preferably more than six inches. In the arrangement of Figure 3, the adsorbent should be supplied to tubes 161 at a rate not in excess of the maximum rate at which the adsorbent will freely fall through the column of solvent within the tubes. This may be accomplished by throttling the flow above the washer.

By way of example of suitable application of this invention, its use for a typical petroleum decolorization operation may be considered. In this application, it is desired to wash a spent adsorbent used for decolorizing a Mid-Continent oil stock from an initial color of 200 Lovibond to a product color of 100 Lovibond. The adsorbent is a 15/30 mesh fuller's earth having an apparent density $S_a$ of about 0.5 gram per cubic centimeter, at which density the fraction of voids, F, is about 0.48. The true density of the adsorbent is 2.5 grams per cubic centimeter, and the average particle diameter is about 0.03 inch. In the treating operation, 14 pounds of decolorized oil product are obtained per 1 pound of adsorbent throughput (dry basis) or about 7.8 volumes of oil per volume of fresh adsorbent charge. The spent adsorbent is discharged from the treater at a temperature of 300° F., along with about 1.1 volumes of oil per volume of adsorbent. The adsorbent is subjected to draining to remove some of the entrained oil, which is recycled to the treater. Then the drained adsorbent, along with about 0.5 volume of entrained oil per volume of adsorbent and also a hydrocarbonaceous contaminant deposit, is delivered to a washer of the general type shown in Figure 2 at a temperature of 300° F. and a rate of 1.4 tons of adsorbent (clean dry basis) per hour. The density of the entrained oil is about 0.892 gram per cubic centimeter at standard conditions. The washer has a diameter of 3 feet in the column section and a diameter of 4.4 feet in the disengaging section. The length of the column section overall is about 15 feet, so as to provide for an adsorbent column of about 10 feet in depth. The height of the disengaging section is 4.5 feet, and the liquid withdrawal channel 104 is arranged to provide a liquid body having a depth of 3.5 feet above the adsorbent column. The adsorbent enters through a single pipe having a diameter of 12 inches rather than a plurality of pipes, as shown in Figure 2. The adsorbent inlet pipe terminates within the liquid body about 12 inches below the surface thereof and about 2.5 feet above the surface of the adsorbent column. The spent adsorbent is delivered onto the column at a temperature of about 140° F. A paraffinic naphtha fraction having a gravity of 59° A.P.I., at standard conditions, a viscosity of 0.45 centipoise at 100° F. and a boiling range of 210 to 320° F. is introduced into the lower section of the washer at a temperature of about 80° F. so as to maintain the average temperature in the adsorbent column in the washing zone at about 100° F. The adsorbent is supplied to the upper section of the washer and withdrawn from the lower end thereof at a rate calculated to provide an adsorbent residence time in the washing zone of 0.8 hour. The naphtha supply rate is controlled to provide a superficial velocity within the washing column of about 12 feet per hour. The volumetric naphtha to adsorbent throughput ratio is about 0.9. The linear upward velocity of the fluid in the liquid body above hte washing column is about 31.7 feet per hour at the 140° F. average temperature in the liquid body. The naphtha-oil stream withdrawn from the upper section of the liquid body has a density of 0.793 gram per cubic centimeter and a viscosity of 1.2 centipoises at the conditions employed therein. A portion of this stream is cooled to 100° F. and recycled to the adsorbent inlet pipe to cool the adsorbent. The recycle rate employed is about 5.5 pounds per pound of spent adsorbent charge to the washer. The remainder of the solvent-oil stream is subjected to fractionation to recover the cycle oil. The recovered cycle oil has a color of about 170 Lovibond and is recycled to the treater as feed in addition to the fresh adsorbent oil feed. Washed adsorbent is dried at about 400° F. and, thereafter, regenerated by burning at a temperature in the range 900 to 1,400° F. It is thereafter cooled and recycled to the treater. The washed adsorbent, after drying to remove naphtha, contained 5.7 percent by weight hydrocarbonaceous material, of which 1.7 percent was extractable by Soxhlet extraction with 50 percent methyl ethyl ketone and 50 percent benzol. The non-extractible residual deposit amounts to about 4.0 percent by weight of the adsorbent. For this particular application, under the operating conditions involved, the critical minimum and the maximum allowable superficial solvent velocities in the washing column as calculated by Equations 1 and 2 are 11 and 326 feet per hour, respectively. The maximum and minimum linear velocities for the disengaging section, as calculated by Equations 4 and 5, are 62 and 31 feet per hour, respectively.

It is intended to cover all changes and modifications of the examples of the operation and application of this invention herein chosen for purposes of the disclosure which do not constitute departures from the spirit and scope of the invention.

We claim:

1. A method for continuous solvent washing of spent treating adsorbent made up principally of particles within the size range about 4 to 100 mesh Tyler to recover from the adsorbent entrained valuable liquid materials without removal from the adsorbent of excessive amounts of impurities deposited thereon during treatment of like liquid material, which method comprises passing the spent adsorbent as a columnar mass of gravitating particles downwardly through a confined washing zone countercurrently to a stream of suitable wash solvent which is miscible with said liquid material but physically separable therefrom without substantial damage to its components and which has a substantially lower solvent capacity for said impurities than for said liquid material, which solvent is introduced into the lower section of said zone, withdrawing washed adsorbent substantially free of said valuable liquid material but still bearing a major portion of the originally deposited impurities from the lower section of said washing zone at a rate controlled to maintain the adsorbent residence time in said columnar mass within the range of about 0.2 to 5 hours and replenishing said columnar mass at its upper end with spent adsorbent, maintaining the temperature in said washing zone below the boiling point of said wash solvent, controlling the rate of solvent introduction into the lower section of said columnar mass to maintain the volumetric ratio of solvent to absorbent throughput through said washing zone in excess of 0.2 and below about 3.0 and further controlling the relative length to horizontal cross-sectional area of said columnar mass and the rate of solvent introduction to maintain the superficial velocity of said solvent as it passes upwardly through the columnar mass below that which would cause substantial disruption of the columnar mass but above that defined by the equation:

$$U = \frac{38,500 D^2 F (S_o - S_s)}{Z_s (1 - F)}$$

where U is the superficial velocity of the solvent in the washing zone in feet per hour, D is the average particle diameter of the adsorbent particles in inches, $Z_s$ is the viscosity of the solvent is centipoises under the average conditions in the washing zone, $S_o$ and $S_s$ are the densities of the liquid material and the solvent, respectively, under the average conditions in the washing zone in grams per cubic centimeter, and F is the fraction of voids between adsorbent particles in a column of dry adsorbent formed by pouring dry adsorbent into a receptacle without substantial agitation, whereby the valuable liquid material is efficiently removed from the spent adsorbent, and withdrawing the wash solvent and removed valuable liquid material from the upper section of said columnar mass.

2. A method according to claim 1 characterized in that the rate of adsorbent withdrawal from the washing zone is controlled to maintain the adsorbent residence time in the washing zone within the range about 0.6 to 5 hours.

3. A continuous process for solvent washing adsorbents of palpable particle form which have become spent by use for decolorizing mineral oils and which are withdrawn from a decolorizing zone along with a substantial amount of entrained mineral oil and carbonaceous deposits, including color bodies, the adsorbent being made up principally of particles falling in the size range about 4 to 100 mesh Tyler, which method comprises maintaining a columnar mass of said adsorbent in a lower portion of a confined washing zone, introducing a suitable nonpolar wash solvent boiling substantially below said entrained mineral oil into the lower section of said columnar mass and passing it upwardly therethrough to remove the entrained oil from said adsorbent, flowing the liquid solvent and recovered oil upwardly from the surface of the columnar mass into a body of said liquid maintained immediately thereabove, withdrawing solvent and recovered oil from the upper section of said liquid body, introducing the spent adsorbent into said liquid body at a level below its surface and passing it downwardly onto the surface of said columnar mass, withdrawing washed adsorbent substantially free of said mineral oil but still bearing a major portion of the carbonaceous deposits, including color bodies contained by the spent adsorbent supplied to said washing zone, from the lower section of said washing zone at a rate controlled to maintain the residence time of adsorbent in passing through said washing zone within the range about 0.2 to 5 hours, maintaining the temperature in said washing zone below the boiling point of said wash solvent, and controlling the rate of solvent introduction into and passage upwardly through said columnar mass in excess of about 0.2 and below about 3.0 volumes of solvent per volume of adsorbent passed through said washing zone and further controlling the relative length to horizontal cross-sectional area of said columnar mass and the rate of solvent introduction to maintain the superficial velocity of said solvent as it passes upwardly through the columnar mass below that which would cause substantial disruption of the columnar mass but above that defined by the equation:

$$U = \frac{38,500 D^2 F (S_o - S_s)}{Z_s (1 - F)}$$

where U is the superficial velocity of the solvent in the washing zone in feet per hour, D is the average adsorbent particle diameter in inches, $Z_s$ is the viscosity of the solvent under the average conditions within said washing zone in centipoises. $S_o$ and $S_s$ are the densities of the oil and solvent, respectively, under the average conditions within the washing zone in grams per cubic centimeter, and F is the fraction of voids between adsorbent particles in a column of such adsorbent formed by pouring dry adsorbent into a receptacle without substantial agitation, whereby the entrained oil is effectively recovered from the adsorbent by the solvent without excessive removal from the adsorbent of said carbonaceous contaminant, including color bodies.

4. A method for continuous solvent washing of valuable liquid hydrocarbon material from spent treating adsorbent of palpable particulate form also bearing impurities removed from like hydrocarbon material without removing excessive amounts of said impurities from the adsorbent, the adsorbent being made up of particles falling in the size range about 10 to 60 mesh Tyler with a minor percentage of smaller sized particles, which method comprises passing the spent adsorbent downwardly as a confined stream through a liquid body of wash solvent and recovered hydrocarbon material maintained in an upper section of a confined washing zone and discharging it downwardly from said confined stream at a level substantially below the surface of the liquid body and delivering it onto the surface of a columnar mass of said adsorbent maintained throughout a substantial portion of said washing zone below said liquid body, passing the adsorbent downwardly in said columnar mass to contact a wash solvent at a temperature maintained at a level below about 180° F. unsuitable for resolution of excessive amounts of the impurities on the adsorbent, withdrawing the washed adsorbent substantially free of the valuable liquid hydrocarbon material but still bearing a major portion of said impurities from the lower section of said washing zone at a rate controlled to maintain the residence time of the adsorbent in said columnar mass within the washing zone within the range about 0.2 to 5 hours, introducing a non-polar wash solvent boiling substantially below said valuable liquid hydrocarbon material into the lower section of said washing zone and passing it upwardly through said columnar mass to remove the valuable liquid hydrocarbon material from the adsorbent, controlling the rate of said solvent introduction to maintain the volumetric ratio of solvent passage upwardly through said columnar mass to adsorbent passage downwardly therethrough above about 0.2 and below about 3.0 and further controlling the relative length to horizontal cross-sectional area of said columnar mass and the rate of solvent introduction to maintain the superficial velocity of said solvent as it passes upwardly through the columnar mass below that which would disrupt the columnar mass but sufficiently high to cause a pressure drop due to its flow upwardly through the columnar mass in excess of the static pressure differential expressed by the equation:

$$\Delta P = L(S_o - S_s)$$

where L is the length of columnar mass through which the solvent passes and $S_o$ and $S_s$ are the densities of the oil and solvent respectively under the conditions in the washing zone, whereby the entrained oil is effectively recovered from the adsorbent, flowing the solvent and recovered oil upwardly from the surface of said columnar mass into said liquid body, withdrawing said solvent and recovered liquid hydrocarbon material from the upper section of said liquid body and controlling the upward liquid superficial velocity in said liquid body not in excess of that defined by the equation:

$$U_d = \frac{113}{Z}\left(\frac{S_a}{1-F}\right)\left(1 - \frac{S_L}{S_t}\right)$$

but above that defined by the equation:

$$U_d = \frac{28.3}{Z}\left(\frac{S_a}{1-F}\right)\left(1 - \frac{S_L}{S_t}\right)$$

where $U_d$ is the linear velocity of the liquid in said liquid body in feet per hour, $S_a$ is the apparent density of the adsorbent in grams per cubic centimeter of the adsorbent as measured in a column formed by pouring dry adsorbent into a receptacle without substantial agitation, $S_t$ is the true density of the solid adsorbent material in grams per cubic centimeter, $S_L$ is the density of the liquid in said body under the conditions therein in grams per cubic centimeter, Z is the viscosity of the liquid in said body under the conditions therein in centipoises and F is the fraction of voids between the particles under apparent density conditions $S_a$.

5. A method for continuous solvent washing of valuable liquid hydrocarbon material from spent treating adsorbent of palpable particulate form also bearing impurities removed from like hydrocarbon material without excessive removal of said impurities from the adsorbent, the adsorbent being made up of particles falling within the range about 10 to 60 mesh Tyler with a minor percentage of smaller particles, which method comprises passing the spent adsorbent as a columnar mass of gravitating particles downwardly through a confined washing zone countercurrently to a stream of suitable non-polar wash solvent boiling substantially below said valuable hydrocarbon material introduced into the lower section of said zone, withdrawing washing adsorbent substantially free of said valuable hydrocarbon material but still bearing a major portion of said impurities from the lower section of said washing zone at a rate controlled to maintain the residence time of adsorbent in passing through said washing zone within the range of about 0.2 to 5 hours, maintaining the temperature in said washing zone below the boiling point of said wash solvent, controlling the rate of introduction of said wash solvent to said washing zone in excess of about 0.2 and below about 3.0 volumes of solvent per volume of adsorbent throughput through said washing zone and controlling the superficial velocity of said solvent flow upwardly through said washing zone above that defined by the equation:

$$U = \frac{38,500 D^2 F(S_o - S_s)}{Z_s(1-F)}$$

and below that defined by the equation:

$$U = \frac{250,000 D^2 \left(\frac{S_a}{1-F}\right)\left(1 - \frac{S_a}{S_t}\right)}{Z_s} - V_c F$$

where U is the superficial velocity of the solvent in the washing zone in feet per hour, D is the average adsorbent particle diameter in inches, $Z_s$ is the viscosity in centipoises of the solvent under the average conditions within the washing zone, $S_o$ and $S_s$ are the density in grams per cubic centimeter of said valuable liquid hydrocarbon material on the adsorbent and the density of said solvent, respectively, under the average conditions within said washing zone, $S_a$ is the apparent density of the adsorbent in grams per cubic centimeter as measured in a column of dry adsorbent formed by pouring dry adsorbent into a receptacle without substantial agitation, $S_t$ is the true density of the solid adsorbent material in grams per cubic centimeter, F is the fraction of voids between the adsorbent particles under the same conditions at which $S_a$ is determined and within the range about 0.42 to 0.49, and $V_c$ is the linear velocity of the solid particles through the washing zone in feet per hour, whereby the valuable liquid hydrocarbon material is effectively removed from said columnar mass by said solvent without removal of excessive amounts of said impurities from the adsorbent and flowing the liquid solvent and recovered liquid hydrocarbon material upwardly from the surface of said columnar mass through an upper portion of the washing zone as a body of liquid, controlling the upward liquid velocity in said body not in excess of that defined by the equation:

$$U_d = \frac{113}{Z}\left(\frac{S_a}{1-F}\right)\left(1 - \frac{S_L}{S_t}\right)$$

but above that defined by the equation:

$$U_d = \frac{28.3}{Z}\left(\frac{S_a}{1-F}\right)\left(1-\frac{S_L}{S_t}\right)$$

where $U_d$ is the linear velocity of the liquid in said liquid body in feet per hour, $S_a$ is the apparent density of the adsorbent in grams per cubic centimeter, $S_t$ is the true density of the solid adsorbent material in grams per cubic centimeter, $S_L$ is the density of the liquid in said body under the conditions therein in grams per cubic centimeter, $Z$ is the viscosity of the liquid in said body under the conditions therein in centipoises and $F$ is the fraction of voids between the particles under apparent density conditions $S_a$, and withdrawing the solvent and recovered hydrocarbon material from the upper section of said liquid body.

6. The method of claim 5 characterized in that said liquid body is of substantially larger horizontal cross-sectional area than said columnar mass and the velocity of the liquid flow in said liquid body is maintained below that defined by the equation:

$$U_d = \frac{56.5}{Z}\left(\frac{S_a}{1-F}\right)\left(1-\frac{S_L}{S_t}\right)$$

and above that defined by the equation:

$$U_d = \frac{28.3}{Z}\left(\frac{S_a}{1-F}\right)\left(1-\frac{S_L}{S_t}\right)$$

whereby adsorbent particles of size smaller than about 200 mesh Tyler are entrained in the solvent and recovered hydrocarbon material withdrawn from the upper section of said liquid body and entrainment of adsorbent particles of size greater than about 150 mesh Tyler is avoided.

7. A continuous process for solvent washing adsorbents of palpable particle form made up of particles falling within the range about 10 to 60 mesh Tyler with a minor percentage of smaller particles, which adsorbents have become spent by use for decolorizing mineral oils and which are withdrawn from a decolorizing zone along with a substantial amount of entrained mineral oil and carbonaceous deposits, including color bodies, which method comprises passing the spent adsorbent downwardly as a confined stream through a liquid body of washing solvent and oil maintained in an upper section of a confined washing zone and discharging it downwardly from said confined stream at a level substantially below the surface of the liquid body and permitting it to fall onto the surface of a columnar mass of said adsorbent maintained throughout a substantial portion of the washing zone, said columnar mass being of substantially less horizontal cross-sectional area along at least most of its length than said liquid body, passing the adsorbent downwardly through said columnar mass to contact a non-polar wash solvent at a temperature level maintained below the boiling point of said solvent and withdrawing the washed adsorbent substantially free of said mineral oil but still bearing a major portion of said carbonaceous deposits, including color bodies, from the lower section of said washing zone at a rate controlled to maintain the residence time of adsorbent in passing through said washing zone within the range of about 0.2 to 5 hours, introducing a non-polar wash solvent boiling substantially below said mineral oil into the lower section of said washing zone at a rate in excess of 0.2 and below about 3.0 volumes per volume of adsorbent passed through said zone and flowing the solvent upwardly through said columnar mass to remove the entrained oil from the adsorbent, controlling the relative length to horizontal cross-section of said columnar mass and further controlling the rate of solvent introduction to maintain the superficial velocity of said solvent as it passes upwardly through the columnar mass above that defined by the equation:

$$U = \frac{38,500 D^2 F(S_o - S_s)}{Z_s(1-F)}$$

and below that defined by the equation:

$$U = \frac{250,000 D^2 \left(\frac{S_a}{1-F}\right)\left(1-\frac{S_s}{S_t}\right)}{Z_s} - V_c F$$

where $U$ is the superficial velocity of the solvent in the washing zone in feet per hour, $D$ is the average adsorbent particle diameter in inches, $Z_s$ is the viscosity in centipoises of the solvent under the average conditions within the washing zone, $S_o$ and $S_s$ are the density in grams per cubic centimeter of said valuable liquid hydrocarbon material on the adsorbent and the density of said solvent, respectively, under the average conditions within said washing zone, $S_a$ is the apparent density of the adsorbent in grams per cubic centimeter as measured in a column of dry adsorbent formed by pouring dry adsorbent into a receptacle without substantial agitation, $S_t$ is the true density of the solid adsorbent material in grams per cubic centimeter, $F$ is the fraction of voids between the adsorbent particles under the same conditions at which $S_a$ is determined and within the range about 0.42 to 0.49, and $V_c$ is the linear velocity of the solid particles through the washing zone in feet per hour, flowing the recovered oil and solvent upwardly from said columnar mass and through said liquid body thereabove at a velocity not in excess of that defined by the equation:

$$U_d = \frac{113}{Z}\left(\frac{S_a}{1-F}\right)\left(1-\frac{S_L}{S_t}\right)$$

but above that defined by the equation:

$$U_d = \frac{56.5}{Z}\left(\frac{S_a}{1-F}\right)\left(1-\frac{S_L}{S_t}\right)$$

where $U_d$ is the linear velocity of the liquid in said liquid body in feet per hour, $S_a$ is the apparent density of the adsorbent material in grams per cubic centimeter, $S_L$ is the density of the liquid in said body under the conditions therein in grams per cubic centimeter, $Z$ is the viscosity of the liquid in said body under the conditions therein in centipoises, and $F$ is the fraction of voids between the particles under apparent density conditions $S_a$, and withdrawing the solvent and recovered oil from the upper section of said liquid body.

8. A method for continuous solvent washing of valuable liquid hydrocarbon material from spent treating adsorbent of palpable particulate form also bearing impurities removed from like hydrocarbon material, the adsorbent being made up of particles falling within the size range about 10 to 60 mesh Tyler with a minor percentage of smaller particles, which method comprises passing the spent adsorbent as a columnar mass of gravitating particles downwardly through a confined washing zone countercurrently to a stream of suitable non-polar wash solvent boiling substantially below said valuable liquid hydrocarbon material, which solvent is introduced into the lower section of said zone, withdrawing washed adsorbent substantially free of said valuable hydrocarbon material from the lower section of said washing zone at a rate controlled to maintain the adsorbent residence time in said washing zone within the range about 0.6 to 5 hours, maintaining the temperature in said washing zone below the boiling point of said solvent, controlling the rate of introduction of said wash solvent to said washing zone in excess of about 0.2 volume of solvent per volume of adsorbent throughput through said washing zone and controlling the superficial velocity of said solvent flow upwardly through said washing zone above that defined by the equation:

$$U = \frac{38,500 D^2 F(S_o - S_s)}{Z_s(1-F)}$$

and below that defined by the equation:

$$U = \frac{250{,}000 D^2 \left(\frac{S_a}{1-F}\right)\left(1-\frac{S_s}{S_t}\right)}{Z_s} - V_c F$$

where U is the superficial velocity of the solvent in the washing zone in feet per hour, D is the average adsorbent particle diameter in inches, $Z_s$ is the viscosity in centipoises of the solvent under the average conditions within the washing zone, $S_o$ and $S_s$ are the density in grams per cubic centimeter of said valuable liquid hydrocarbon material on the adsorbent and the density of said solvent, respectively, under the average conditions within said washing zone, $S_a$ is the apparent density of the adsorbent in grams per cubic centimeter as measured in a column of dry adsorbent formed by pouring dry adsorbent into a receptacle without substantial agitation, $S_t$ is the true density of the solid adsorbent material in grams per cubic centimeter, F is the fraction of voids between the adsorbent particles under the same conditions at which $S_a$ is determined and within the range about 0.42 to 0.49, and $V_c$ is the linear velocity of the solid particles through the washing zone in feet per hour, whereby the valuable liquid hydrocarbon material is effectively removed from said columnar mass by said solvent, and withdrawing the liquid solvent and recovered liquid hydrocarbon material upwardly from the surface of said columnar mass into a body of said liquid maintained above said columnar mass, whereby the liquid is disengaged from the columnar mass, and withdrawing the solvent and recovered hydrocarbon material from said liquid body.

References Cited in the file of this patent

UNITED STATES PATENTS 2,771,407    Penick _____ Nov. 20, 1956